United States Patent Office 3,657,245
Patented Apr. 18, 1972

3,657,245
CERTAIN 5H,8H-THIAZOLO[3,2-a]PYRROLO[2,3-d]
PYRIMIDIN-5-ONES
Gerhard Bormann, Basel, and Franz Troxler, Bottmingen, Switzerland, assignors to Sandoz Ltd. (also known as Sandoz AG), Basel, Switzerland
No Drawing. Filed Aug. 20, 1970, Ser. No. 65,726
Claims priority, application Switzerland, Aug. 29, 1969, 13,143/69
Int. Cl. C07d 99/06
U.S. Cl. 260—256.5 R
8 Claims

ABSTRACT OF THE DISCLOSURE

The present invention concerns new compounds of the formula:

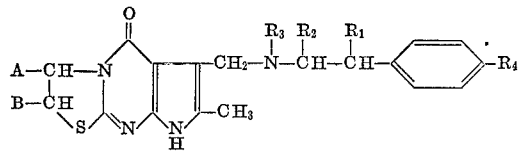

wherein A and B together form a single bond, or A is ethoxy or hydroxymethyl and B is hydrogen, $R_1$ is hydrogen or hydroxy, $R_2$ is hydrogen or methyl, $R_3$ is methyl, or $R_3$ is hydrogen when $R_2$ is methyl, and $R_4$ is hydrogen, methoxy or chlorine.

The compounds are useful in the prophylaxis of thrombosis and embolism and for improving microcirculation.

---

The present invention relates to new compounds of Formula I,

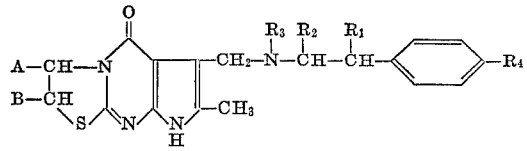

wherein A and B together form a single bond, or
A is ethoxy or hydroxymethyl and
B is hydrogen,
$R_1$ is hydrogen or hydroxy,
$R_2$ is hydrogen or methyl,
$R_3$ is methyl, or $R_3$ is hydrogen when $R_2$ is methyl, and
$R_4$ is hydrogen, methoxy or chlorine, as well as to a process for the production thereof.

In accordance with the invention a compound of Formula I is obtained by reacting a compound of Formula II,

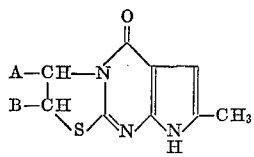

wherein A and B are as defined above, with formaldehyde and an amine of Formula III,

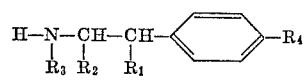

wherein $R_1$, $R_2$, $R_3$ and $R_4$ are as defined above, in an inert solvent.

Acid addition salts may be produced from resulting free bases and free bases may be produced from resulting salts in conventional manner.

The process of the invention represents in principle a Mannich reaction, and the modifications and improvements of the Mannich process may be applied to the process.

Formaldehyde as such or in the form of a formaldehyde-releasing compound, e.g. paraformaldehyde, may be used for the process of the invention. On the other hand the amines of Formula III may optionally be used in the form of their salts, whereby the corresponding acid addition salts of the compounds of Formula I are obtained.

Water is conveniently used as inert solvent, but a lower alkanol such as isopropanol or isoamyl alcohol, a cyclic ether such as dioxane, or mixtures thereof with water, are also suitable.

The process of the invention may, for example, be effected by stirring for an extended period, a mixture of an acid addition salt of an amine of Formula III, e.g. the hydrochloride, a compound of Formula II, and formaldehyde, e.g. as an approximately 40% aqueous solution.

The reaction is preferably effected at an elevated temperature, e.g. at 40° to 80° C., and has a duration of 1 to 24 hours.

The mixture may, for example, contain approximately 1 to 1.3 mols of formaldehyde, and 1 to 2 mols of an amine of Formula III in the form of its hydrochloride, for every mol of a compound of Formula II. Approximately 1 mol of sodium acetate for every mol of amine hydrochloride is preferably used as buffer.

The compounds of Formula I produced in accordance with the invention may be isolated as free bases or in the form of an acid addition salt and may be purified in conventional manner, e.g. by crystallization.

The compounds of Formula II, used as starting materials, are new.

The compound of Formula IIa

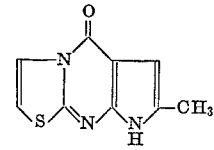
IIa may be produced by reacting, e.g., 4-hydroxy-2-mercapto-6-methyl-7H-pyrrolo[2,3-d]pyrimidine of Formula IV

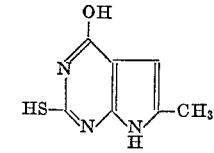
IV with chloro acetaldehyde. This reaction may be effected, for example, by stirring the compound of Formula IV with a 30% aqueous chloroacetaldehyde solution at an elevated temperature. Dehydration of the resulting 2,3-dihydro-3-hydroxy-7-methyl-5H,8H-thiazolo[3,2-a]pyrrolo[2,3-d]pyrimidin-5-one of Formula V,

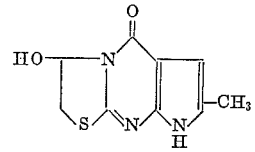
V e.g. with potassium hydrogen sulphate by heating to about 300° to 340° C. in a sublimation apparatus and at about 15 mm. of Hg, yields the compound of Formula IIa.

The compound of Formula IIb

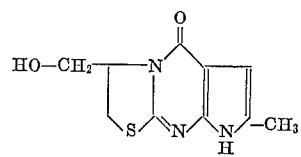
IIb may, for example, be obtained by reacting the compound of Formula IV with an epihalohydrin, e.g. epichlorhydrin, in an alkali metal hydroxide or ammonium hydroxide solution, e.g. a sodium hydroxide solution, preferably while stirring. The reaction may conveniently be effected at room temperature.

3-ethoxy-2,3-dihydro-7-methyl-5H,8H - thiazolo[3,2-a]-pyrrolo[2,3-d]pyrimidin-5-one of Formula IIc

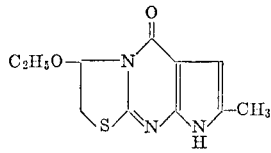

may, for example, be produced by reacting 4-hydroxy-2-mercapto-6-methyl-7H-pyrrolo[2,3-d]pyrimidine of Formula IV in an alkali metal hydroxide solution with bromo acetaldehydediethyl acetal, preferably by heating to the boiling temperature of the reaction mixture, and converting the resulting 2-(2,2-diethoxyethylmercapto)-4-hydroxy-6-methyl - 7H - pyrrolo[2,3-d]pyrimidine into the compound of Formula IIc, e.g. by boiling in an alcoholic hydrogen chloride solution.

Insofar as the production of the starting materials is not described, these are known or may be produced in accordance with known processes, or in a manner analogous to the processes described herein.

The compounds of Formula I and acid addition salts thereof are useful because they possess pharmacological activity. More particularly, the compounds are useful in the prophylaxis of thrombosis and embolism and for improving microcirculation as indicated by their properties in inhibiting blood platelet aggregation caused by adenosin diphosphate in blood platelet-rich rabbit plasma (turbidimetric method in accordance with Born).

For the abovementioned use, the dosage administered will naturally vary depending upon the compound empolyed, mode of administration and treatment desired. However, in general, satisfactory results are obtained at dosages between about 0.1 to about 5 mg./kg. animal body weight, conveniently given in divided doses 2 to 3 times a day or in sustained release form. For the larger mammals, the total daily dosage is in the range of from about 10 mg. to about 400 mg., and unit dosage forms suitable for oral administration comprise from about 3 to about 200 mg. of the compound admixed with a solid or liquid pharmaceutical carrier or diluent.

In the following examples which illustrate the invention without in any way limiting its scope, all temperatures are indicated in degrees centigrade and are uncorrected.

EXAMPLE 1

7-methyl-6-[N-(2-phenylethyl)methylaminomethyl]5H,-8H-thiazolo[3,2-a]pyrrolo[2,3-d]pyrimidin-5-one 5 g. of sodium acetate and 4.82 cc. of a 40% formaldehyde solution are added to a solution of 8.2 g. of N-methyl-phenethyl amine in 120 cc. of a 0.5 N hydrogen chloride solution. 10 g. of 7-methyl-5H,8H-thiazolo-[3,2-a]pyrrolo[2,3-d]pyrimidin-5-one are added, and the reaction mixture is stirred at an internal temperature of 50° for 12 hours. After cooling the undissolved portion is filtered off, potassium carbonate is added to the filtrate and this is shaken out thrice with methylene chloride. The combined organic phases are dried over magnesium sulphate and are then evaporated to dryness. For purposes of purification the evaporation residue is dissolved in a dilute tartaric acid solution and the solution is shaken out with ether. The tartaric acid solution is again made alkaline with a sodium hydroxide solution and is shaken out with methylene chloride. The methylene chloride solution is dried over magnesium sulphate, is evaporated to dryness, and the evaporation residue is triturated with ether. The resulting 7-methyl-6-[N-(2-phenylethyl)methylaminomethyl]5H,8H - thiazolo[3,2 - a]pyrrolo[2,3-d]-pyrimidin - 5 - one crystallizes from methanol/methylene chloride in prisms having a M.P. of 183–186°.

The 7 - methyl - 5H,8H-thiazolo[3,2-a]pyrrolo[2,3-d]-pyrimidin-5-one, used as starting material, is obtained as follows:

4 - hydroxy - 2 - mercapto-6-methyl-7H-pyrrolo[2,3-d] pyrimidine is stirred in a 1 N sodium hydroxide solution with a 30% aqueous chloro acetaldehyde solution at 80° for 15 minutes. The resulting 2,3-dihydro-3-hydroxy-7-methyl - 5H,8H-thiazolo[3,2-a]pyrrolo[2,3-d]-pyrimidin-5-one (M.P. 283–286° from methanol) is converted into 7 - methyl - 5H,8H - thiazolo[3,2-a]pyrrolo[2,3-d]pyrimidin-5-one by heating to 300–340° with potassium hydrogen sulphate in a sublimation apparatus at 15 mm. of Hg. 7 - methyl - 5H,8H - thiazolo[3,2-a]pyrrolo[2,3-d]pyrimidin-5-one crystallizes from dimethyl formamide/water in needles having a M.P. above 320°.

The following compounds of Formula I are obtained in analogous manner in accordance with the process of the invention from the corresponding compounds of Formula II by reaction with formaldehyde and compounds of Formula III.

| Example | $R_1$ | $R_2$ | $R_3$ | $R_4$ | A | B | M.P., degrees | From compounds of Formula II with M.P., degrees |
|---|---|---|---|---|---|---|---|---|
| 2 | H | H | $CH_3$ | H | $CH_2OH$ | H | 170–173 | a 293–295 |
| 3 | H | H | $CH_3$ | H | $OC_2H_5$ | H | 129–132 | b 242–244 |
| 4 | H | H | $CH_3$ | $OCH_3$ | Bond |  | 159–161 | >320 |
| 5 | H | H | $CH_3$ | Cl | Bond |  | 167–170 | >320 |
| 6 | H | $CH_3$ | H | H | Bond |  | c 214–216 | >320 |
| 7 | OH | $CH_3$ | H | H | Bond |  | d 178–180 | >320 | a 2,3-dihydro-3-hydroxymethyl-7-methyl-5H,8H-thiazolo[3,2-a]pyrrolo[2,3-d]pyrimidin-5-one is obtained as follows: 2,3-dihydro-3-hydroxymethyl-7-methyl-5H,8H-thiazolo[3,2-a]pyrrolo[2,3-d]pyrimidin-5-one is obtained from 4-hydroxy-2-mercapto-6-methyl-7H-pyrrolo[2,3-d]pyrimidine with epichlorhydrin in the presence of 1.5 mols of sodium hydroxide solution by stirring for 1 hour at room temperature.

b 3-ethoxy-2,3-dihydro-7-methyl-5H,8H-thiazolo[3,2-a]pyrrolo[2,3-d]pyrimidin-5-one is obtained as follows: 4-hydroxy-2-mercapto-6-methyl-7H-pyrrolo[2,3-d]pyrimidin is converted into 2-(2,2-diethoxyethylmercapto)-4-hydroxy-6-methyl-7H-pyrrolo[2,3-d]pyrimidine (M.P. 198–199° from methanol/water) by boiling for 4 hours in a 1 N sodium hydroxide solution with bromo acetaldehyde diethyl acetal. 3-ethoxy-2,3-dihydro-7-methyl-5H,8H-thiazolo[3,2-a] pyrrolo[2,3-d]pyrimidin-5-one is obtained from 2-(2,2-diethoxyethylmercapto)-4-hydroxy-6-methyl-7H-pyrrolo[2,3-d]pyrimidine by boiling in a 1 N hydrogen chloride solution in ethanol for 15 minutes.

c (Plus)-7-methyl-6-{N-[(2S)-1-phenyl-2-propyl] aminomethyl}-5H,8H-thiazolo[3,2-a]pyrrolo[2,3-d]pyrimidin-5-one, $[\alpha]_D^{20}=+73.2°$ (c.=5.0 in methanol), is obtained by reacting 7-methyl-5H,8H-thiazolo[3,2-a]pyrrolo[2,3-d]pyrimidin-5-one with d-amphetamine and formaldehyde.

d (Plus)-6-{N-[(1R,2S)-1-hydroxy-1-phenyl-2-propyl]aminomethyl}-7-methyl-5H,8H-thiazolo[3,2-a]pyrrolo[2,3-d]pyrimidin-5-one, $[\alpha]_D^{20}=+153°$ (c.=1 in methanol), is obtained by reacting 7-methyl-5H,8H-thiazolo[3,2-a]pyrrolo[2,3-d]pyrimidin-5-one with 1-norephedrine and formaldehyde.

What is claimed is:
1. A compound of the Formula I,

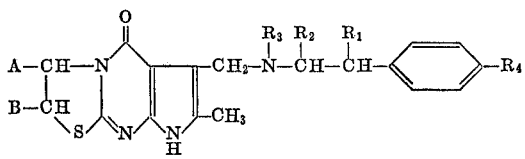

wherein A and B together form a single bond, or A is ethoxy or hydroxymethyl and B is hydrogen, $R_1$ is hydrogen or hydroxy, $R_2$ is hydrogen or methyl, $R_3$ is methyl, or $R_3$ is hydrogen when $R_2$ is methyl, and $R_4$ is hydrogen, methoxy or chlorine, or a pharmaceutically acceptable acid addition salt thereof.

2. The compound of claim 1, which is 7-methyl-6-[N-(2-phenylethyl)methylaminomethyl]-5H,8H - thiazolo[3,2-a]-pyrrolo[2,3-d]pyrimidin-5-one.

3. The compound of claim 1, wherein $R_1$, $R_2$, $R_4$ and B are H, $R_3$ is $CH_3$ and A is $CH_2OH$.

4. The compound of claim 1, wherein $R_1$, $R_2$, $R_4$ and B are H, $R_3$ is $CH_3$, and A is $OC_2H_5$.

5. The compound of claim 1, wherein $R_1$ and $R_2$ are H, $R_3$ is $CH_3$, $R_4$ is $OCH_3$, and A and B together form a single bond.

6. The compound of claim 1, wherein $R_1$ and $R_2$ are H, $R_3$ is $CH_3$, $R_4$ is Cl, and A and B together form a single bond.

7. The compound of claim 1, wherein $R_1$, $R_3$ and $R_4$ are H, $R_2$ is $CH_3$ and A and B together form a single bond.

8. The compound of claim 1, wherein $R_1$ is OH, $R_2$ is $CH_3$, $R_3$ and $R_4$ are H, and A and B together form a single bond.

References Cited
UNITED STATES PATENTS 3,483,198 12/1969 Goldman _____ 260—256.5
3,538,086 11/1970 Mair et al. _____ 260—256.5

ALEX MAZEL, Primary Examiner

R. J. GALLAGHER, Assistant Examiner

U.S. Cl. X.R.

260—570.6, 570.8 R; 424—251